(12) United States Patent
Tanaka

(10) Patent No.: US 6,984,412 B2
(45) Date of Patent: Jan. 10, 2006

(54) METHOD FOR REMOVING WRINKLES, DEVICE FOR REMOVING WRINKLES, AND COATING METHOD

(75) Inventor: Hideki Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 63 days.

(21) Appl. No.: 10/693,975

(22) Filed: Oct. 28, 2003

(65) Prior Publication Data

US 2005/0089640 A1   Apr. 28, 2005

(51) Int. Cl.
*B05D 3/12* (2006.01)
*B05C 11/00* (2006.01)

(52) U.S. Cl. ............ 427/172; 427/289; 427/356; 427/358; 427/359; 427/331; 118/33; 118/34; 118/44; 118/410; 118/419; 118/428; 118/500

(58) Field of Classification Search ........... 427/356, 427/358, 289, 359, 331, 172; 118/410, 411, 118/33, 34, 44, 419, 428, 500
See application file for complete search history.

(56) References Cited

U.S. PATENT DOCUMENTS 5,522,785 A * 6/1996 Kedl et al. ............... 492/21

FOREIGN PATENT DOCUMENTS

| JP | 5-62182 | 3/1993 |
|---|---|---|
| JP | 2578631 | 11/1996 |
| JP | 9-141673 | 6/1997 |
| JP | 11-128822 | 5/1999 |
| JP | 2000-197843 | * 7/2000 |

* cited by examiner

*Primary Examiner*—Katherine Bareford
(74) *Attorney, Agent, or Firm*—Oblon, Spivak, McClelland, Maier & Neustadt, P.C.

(57) ABSTRACT

The present invention provides a method for removing wrinkles formed on a web, which is continuously transported through a plurality of guide members. The plurality of guide member includes a crown roller which has the diameter gradually increased toward the center thereof. The crown roller is placed in a transport path of the web and downstream of a first zone in which wrinkles are desirably removed, and the web is deformed in a second zone located downstream of the crown roller so as to at least decrease the width of the web, whereby the wrinkles in the first zone are removed. Even when the web is thin (10 μm or less), without using particular backup means, wrinkles formed during transport and coating of the web can be removed. In addition, since wrinkles are appropriately removed, a coating film having a uniform thickness can be obtained by an extrusion coating method.

12 Claims, 4 Drawing Sheets

METHOD FOR REMOVING WRINKLES, DEVICE FOR REMOVING WRINKLES, AND COATING METHOD

BACKGROUND OF THE INVENTION

1. Field of the Invention

The present invention relates to methods for removing wrinkles, devices for removing wrinkles, and coating methods. In more particular, the present invention relates to a method for removing wrinkles of a web in a desired zone, particularly in a zone in which a coating liquid is applied thereto, the web being continuously transported by transport means such as guide rollers; to a device for removing wrinkles; and to a method for applying the coating liquid uniformly and stably to the web while wrinkles thereof are appropriately removed.

2. Description of the Related Art

Heretofore, as methods for applying a coating liquid onto a web, for example, there may be mentioned a roll coating method, a gravure coating method, and a doctor coating method. In recent years, an extrusion coating method has drawn attention, in which paint is efficiently used and in which since being applied directly to a web without exposed to the air, the properties of paint are stably maintained.

The extrusion coating method is a coating method in which an extrusion coating head having a front edge surface (located upstream in a web transport direction) and a back edge surface (located downstream in the web transport direction) is pressed toward a web between support rollers or the like, which are used as transport means, so that a predetermined tension is applied to the web and in which the distance between the back edge surface and the web is changed in accordance with the change in amount of a coating liquid extruded from a slit portion so that a film having a predetermined thickness is formed on the web.

In the extrusion coating method described above, due to a tension generated in the longitudinal direction when a web is transported, wrinkles and waves are likely to be formed thereon, and the wrinkles and waves thus formed may cause a continuous or an intermittent variation in thickness in some cases. In particular, in web-coating performed in a process for manufacturing a magnetic recording medium, since the thickness of the web has been decreased (10 $\mu$m or less) concomitant with the recent trend toward higher recording density and a larger memory capacity, the stiffness of the web is decreased, and as a result, problems of wrinkles and waves have become more serious. In order to solve the problems described above, a method for transporting a web has become more significant.

As means for preventing influences of wrinkles generated in a coating portion by transport, a backup roller, which is disposed at a position opposing an extrusion coating device with the web provided therebetween, is generally provided. However, by the method described above, since the coating thickness is determined by the distance between the extrusion coating device and the backup roller, in addition to improvement in dimensional accuracy of the backup roller, more strict control of vibration and deflection accuracy has been increasingly demanded, and in particular, it has been very difficult to form a thin film by coating having a thickness of 1 $\mu$m or less after drying.

In consideration of the situations described above, a coating device has been disclosed in U.S. Pat. No. 2,578,631 and Japanese Unexamined Patent Application Publication No. 9-141173 as means for obtaining a uniform tension in the width direction of a web at a coating portion, in which tension adjusting means or a compression member is provided in the vicinity of the coating device so as to obtain a uniform tension distribution in the width direction of the web. However, according to the method disclosed in the publications described above, since the adjustment is performed by contacting the compression member or the like directly to the coating portion, the coating portion is largely influenced thereby, and as a result, it has been difficult to determine the process conditions.

In addition, a method has been disclosed in Japanese Unexamined Patent Application Publication No. 11-128822, in which tension adjusting means is pressed to a web so as to generate a uniform tension for removing local elongation and deformation of a web formed in the width direction thereof; part of the web, which is further deformed by the step described above, is recovered by using an inlet roller provided at the coating portion; and subsequently coating is performed. In the method described above, since the coating portion is not directly compressed, the influence on the coating is not significant; however, although sags at the "elongated" portion of the web can be prevented, wrinkles formed in the longitudinal direction of the web by transport cannot be removed. That is, in order to remove the wrinkles of the web in the longitudinal direction formed by the transport, it is important that a force pulling the web outside in the lateral direction be applied thereto at the coating portion so as to remove the wrinkles.

As the mechanism for removing wrinkles, based on the principle described above, for example, techniques disclosed in Japanese Unexamined Patent Application Publication Nos. 5-62182 and 12-197843 may be mentioned. In Japanese Unexamined Patent Application Publication No. 5-62182, a technique has been disclosed in which both sides of a web, which is being transported, are held at guide roll portions in front of and behind a coating portion by rollers and are pressed so that a force in the lateral direction is applied to the web. In addition, in Japanese Unexamined Patent Application Publication No. 12-197843, a technique has been disclosed in which both ends of a web are deformed at a coating portion by a device called an edge lifter, or a force is applied by holding the web with a device having a nip mechanism called a cross guider so that both ends of the web are pulled in the lateral direction. In the techniques described above, of course, the wrinkles formed by the transport of the web are naturally removed; however, when both sides of the web are directly lifted at the coating portion, large wrinkles are disadvantageously formed at bending portions. In addition, when the device directly holds the web and applies a force thereto in the lateral direction, the web has been inevitably damaged thereby.

SUMMARY OF THE INVENTION

Accordingly, in order to solve the problems described above, the present invention was made, and an object of the present invention is to provide a method for removing wrinkles, in which even when a thin web (10 $\mu$m or less) is used, wrinkles formed during transport and coating thereof can be removed without using particular backup means; a device for removing wrinkles; and a coating method for forming a film having a uniform thickness using an extrusion coating method by appropriately removing wrinkles.

In order to achieve the object described above, in a method for removing wrinkles formed on a web, according to the present invention, in which the web is continuously transported through a plurality of guide members, said plurality of guide members includes a crown roller having the diameter which is gradually increased toward the center thereof. The method described above comprises the steps of: placing the crown roller in a transport path of the web and downstream of a first zone in which wrinkles are desirably removed; and deforming the web in a second zone located downstream of the crown roller so as to at least decrease the width of the web, whereby the wrinkles in the first zone are removed.

In the method for removing wrinkles, described above, the deformation of the web to decrease the width thereof may be performed by lifting up or pushing down the two end portions of the web.

In a device for removing wrinkles formed on a web, according to the present invention, in which the web is continuously transported through a plurality of guide members, said plurality of guide members comprises: a crown roller which is disposed in a transport path of the web and downstream of a first zone in which wrinkles are desirably removed, the crown roller having the diameter which is gradually increased toward the center thereof; and web-deforming device which is disposed in a second zone located downstream of the crown roller so as to at least decrease the width of the web.

According to the device for removing wrinkles, described above, the web-deforming device is preferably deforming device for lifting up or pushing down the two end portions of the web.

In a method for coating a web, according to the present invention, in which the web is continuously transported through a plurality of guide members, said plurality of guide member includes a crown roller having the diameter which is gradually increased toward the center thereof. The method described above comprises the steps of: placing the crown roller in a transport path of the web and downstream of a first zone in which coating is performed; and deforming the web in a second zone located downstream of the crown roller so as to at least decrease the width of the web for removing wrinkles in the first zone in which the coating is performed, whereby the coating is performed in the first zone in which the wrinkles are removed.

In the coating method according to the present invention, the deformation of the web to decrease the width thereof is preferably performed by lifting up or pushing down the two end portions of the web. In addition, the coating is preferably performed by an extrusion coating device.

According to the method and the device for removing wrinkles of the present invention, even when a thin web is used, wrinkles can be removed in a desired zone in the transport path of the web, and according to the coating method of the present invention, using the method described above, since coating is performed after wrinkles are removed, without providing any particular backup means, a uniform coating film having no irregularity can be obtained.

BRIEF DESCRIPTION OF THE DRAWINGS

FIG. 7 is a schematic front view showing the state in which wrinkles are formed on a web by transport thereof in comparative example 1 or the like;

FIG. 8 is a schematic front view showing the state in which wrinkles are formed on a web by transport thereof in comparative example 3 or the like;

FIG. 9 is a schematic front view showing the state in which wrinkles are formed on a web by transport thereof in example 1 or the like;

DESCRIPTION OF THE PREFERRED EMBODIMENTS

Figure 1:
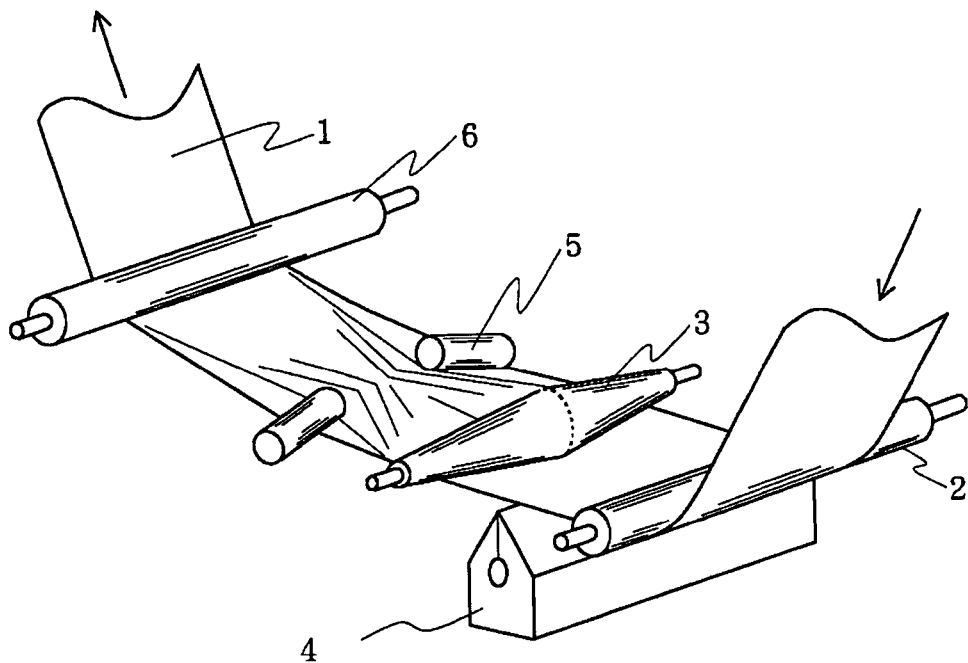
FIG. 1 is a schematic perspective view for illustrating a method for removing wrinkles, a device for removing the wrinkles, and a coating method, according to the present invention.
Figure 2:
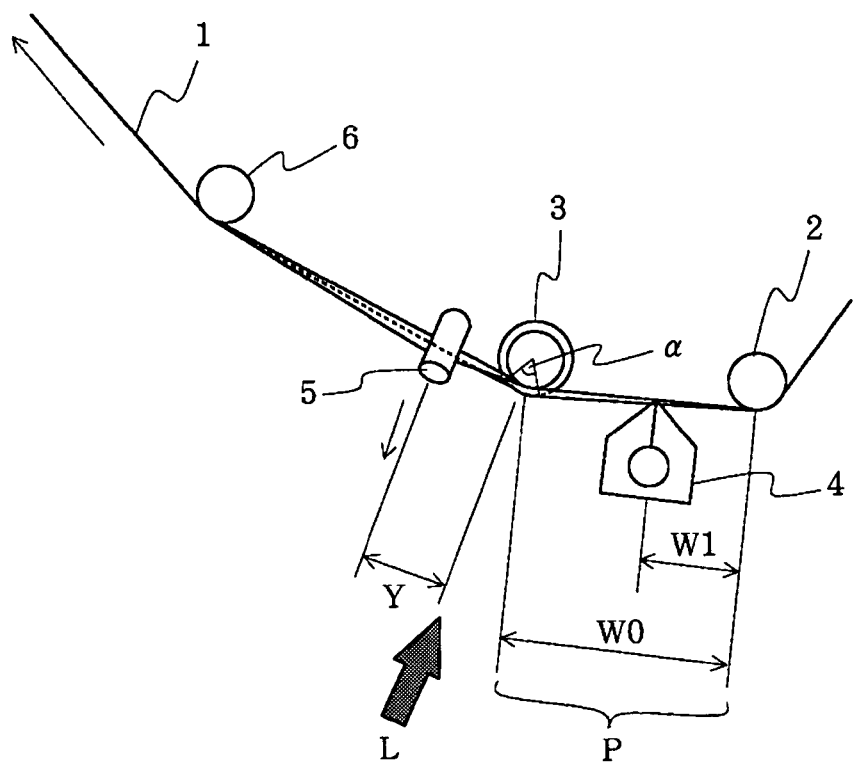
FIG. 2 is a schematic side view for illustrating a method for removing wrinkles, a device for removing the wrinkles, and a coating method, according to the present invention.
Figure 3:
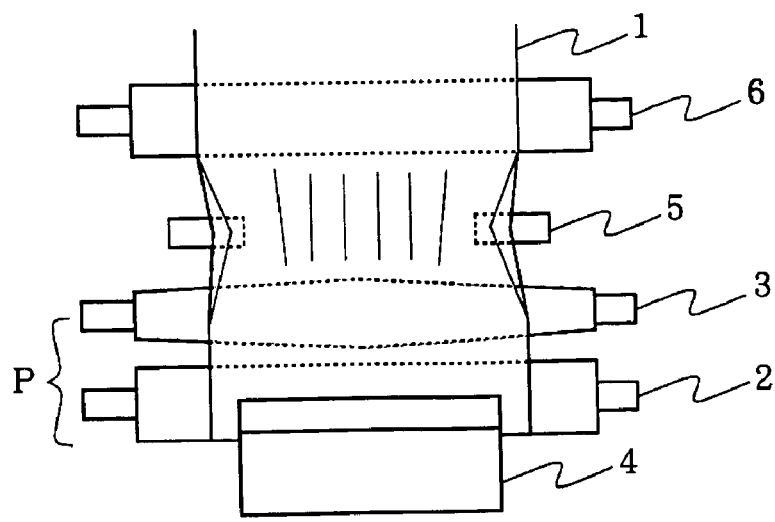
FIG. 3 is a schematic front view for illustrating the methods and the device, shown in FIG. 2, which are viewed along the direction indicated by the arrow L.

FIGS. 1 to 3 are schematic views each illustrating a method for removing wrinkles, a device for removing wrinkles, and a coating method. FIG. 1 is a schematic perspective view showing the entirety, FIG. 2 is a side view thereof, and FIG. 3 is a front view of the entirety viewed along the arrow L shown in FIG. 2. As shown in the figures, in the present invention, in order to remove wrinkles which are formed on a web 1 continuously transported through a plurality of guide members 2, 3, and etc, the guide member 3 having a crown shape, the diameter thereof being gradually increased toward the center, is placed downstream of a zone P which is located in a transport path of the web 1 and in which the wrinkles are desirably removed. In addition, in a zone downstream of the guide member 3, the web 1 is deformed by web-deforming device 5 so that the width thereof is decreased.

A principle for removing wrinkles, according to the present invention, is as follows. That is, since the guide member 3 located downstream of the zone P in which wrinkles are desirably removed has a crown shape, the diameter thereof being gradually increased toward the center thereof, as shown in the figure, a first difference in transport speed (tension) is generated between the center and the two sides of the web 1, and hence wrinkles are formed as if flowing from the center to the both sides of the web 1. In this step, when the web 1 is deformed in a zone located downstream of the guide member 3 so that the width thereof is decreased to generate a second difference in transport speed between the two ends and the center of the web 1, which counteracts the first difference in transport speed, the wrinkles formed by the guide member 3 are removed, thereby generating a uniform tension in the width direction of the web 1, which may not form sags thereof, in the zone in which the wrinkles are desirably removed. That is, it has been construed that since a force applied to the web 1 by the guide member 3 is adjusted by a force generated in the zone located downstream of the guide member 3 by a nonuniform tension, and as a result a force suitable for the properties of the web is applied thereto, the wrinkles of the web can be appropriately removed.

In addition, when coating of the web 1 is performed in the transport path shown in the figure, since the web 1 has no particular backup means at the coating portion, wrinkles formed on the web 1 immediately generate coating irregularity. However, according to the present invention, as shown in FIGS. 1 and 2, by providing coating means 4 in the zone P of the transport path, coating can be performed while wrinkles on the web 1 are properly removed, and hence a uniform coating film having no coating irregularity can be formed. In the case described above, the web 1 is supplied at a predetermined speed from a feed portion (not shown in the figure), is coated by the coating means 4 after passing through the inlet roller 2 used as the guide member located upstream of the zone P, and is then transported to a drying portion (not shown in the figure) through the exit guide roller 3 used as the guide member at the downstream side and the guide roller 6 positioned at a further downstream side. A coating method of the present invention is not specifically limited; however, coating of the web 1 is preferably performed by an extrusion coating device.

Figure 4:
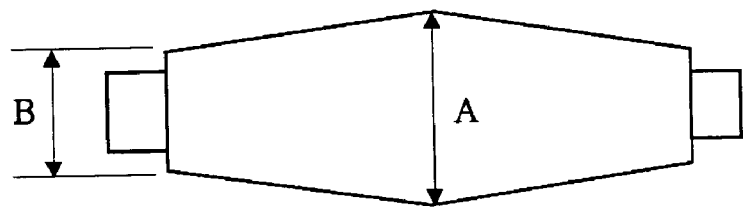
FIG. 4 is a schematic front view showing an example of an exit guide roller having a crown shape.

Among the guide members at the downstream side, the exit guide roller 3 is a crown roller having the diameter gradually increased toward the center thereof, as described above, and in preferable examples shown in FIGS. 1 to 3, a crown shape (shape having a diameter A at the center portion larger than a diameter B at each end portion) having the diameter linearly increased toward the center is formed as shown in FIG. 4. The web 1 is contacted along a part of this exit guide roller 3 at a wrap angle a (see FIG. 2) with respect to the center thereof, and in this step, by the effect obtained by the crown shape of the exit guide roller 3, the difference in transport speed (tension) between the center portion and the two end portions of the web 1 is generated as described above.

Since the exit guide roller 3 may only serve to stretch the web 1 to the width direction when being brought into contact therewith, the absolute values of the entire length, outside diameters, and the like as the member are not specifically limited. As for the diameter, the outside diameter at the each end portion may be at least different from that at the central portion, and for example, in the case of the crown shape shown in FIG. 4, the difference (crown amount) between the outside diameter A at the center portion and the outside diameter B at each end portion may be larger than 0 mm. When the crown amount is 0 mm, a force in the width direction, that is, a force acting from the center portion to the two end portions, is not generated, and as a result, the effect of the present invention cannot be obtained. For example, the crown amount may be set in the range of from approximately 0.1 to 0.5 mm; however, it is not specifically limited and may be determined in consideration of the properties of the web, the layout of the device, and the like. In addition, the entire length of each guide member generally has an allowance of approximately 100 mm with respect to the width of a support (web), and an outside diameter of approximately 40 to 200 mm may be formed. According to the example shown in the figure, the diameter is linearly increased from the two end portions toward the center portion so as to have a peak thereat; however, a crown roller may be formed in which the diameter thereof is gradually increased so as to form a curved line like a Japanese drum.

In the zone located downstream of the exit guide roller 3, as shown in the figure, the web-deforming device 5 for deforming the web 1 so as to decrease the width thereof is provided. As shown in the figure, when the web-deforming device 5 is provided between the exit guide roller 3 having a crown shape and the guide roller 6 at the downstream side thereof, large wrinkles, which are formed by the presence of the exit guide roller 3, are removed in the zone P located between the inlet roller 2 and the exit guide roller 3, thereby generating a uniform tension which may not form sags of the web in the width direction.

As the web-deforming device described above, for example, deforming device which lifts up or pushes down the two end portions of the web may be preferably mentioned. A cross-sectional view in which deforming device lifts up the two end portions of the web is shown in FIG. 10A, and a cross-sectional view in which the deforming device pushes down the two end portions of the web is shown in FIG. 10B. Since the deforming device which lifts up or pushes down the two end portions is not specifically limited, a metal-made roller or a urethane rubber-covered roller may be used, and rotatable web-deforming device is preferably used. Although the effect of removing wrinkles obtained from rotatable means is not different from that from non-rotatable means, in consideration of damages done to the web, rotatable deforming device is preferably used.

In addition, according to the present invention, instead of simultaneously lifting up or pushing down the two end portions of the web, when one of the two end portions is pushed down, and the other end portion is lifted up, the same effect can be obtained. That is, the web-deforming device may at least have the function of deforming the web so as to decrease the width thereof, in other words, the web-deforming device may at least have the mechanism in which the difference in speed (tension) between the central portion of the web 1 and the two end portions thereof is generated and in which a force generated by the crown roller can be adjusted. In addition, as the web-deforming device provided in a coating device, since being provided downstream of the coating portion, in order to avoid the influence on areas on the web to which a coating liquid is applied, pushing-down means is preferably used except for the case in which areas on the web to which a coating liquid is not applied are large. As the web-deforming device, in addition to that described above, a gas jet, suction, or a guide roller having an inverted crown shape (the diameter is gradually decreased toward the center) may also be used, and when the conditions of the present invention can be achieved thereby, the equivalent effect can be obtained.

In the case in which the web 1 is deformed to decrease the width thereof by contacting the roller, which are used as the web-deforming device 5 and made of a metal or covered with a rubber, etc, to the two end portions of the web 1, when the web 1 is thin, creases must be taken into consideration; however, in the present invention, since the web-deforming device 5 is provided downstream of the guide member 3 having a crown shape, creases are unlikely to be formed. If the web 1 is folded once, semipermanent deformation occurs, and hence preferable coating properties cannot be obtained. In addition, conditions in which the roller is brought into contact with the web, such as a distance Y between the position of the rollers and that of the exit guide roller, a contact angle $Z_\theta$ and a contact width X to the web, an amount Z of lifting up or pushing down, and a swing angle β (see FIGS. 2, 6, and 10), may vary subtly in accordance with the layout, the wrap angle with respect to the roller, the stiffness of a web, transport conditions, and the like. In order to obtain an appropriate effect, the roller may not be merely brought into contact with the web with a high pressure, and first of all, the conditions must be adjusted in consideration of the conditions of the crown roller and the web, the relationship therebetween, and the like. For example, when a web having high stiffness is used, adjustment must be carried out so that the roller is weakly brought into contact therewith. In addition, it has also been understood that a tension is one of important factors.

Figure 5:
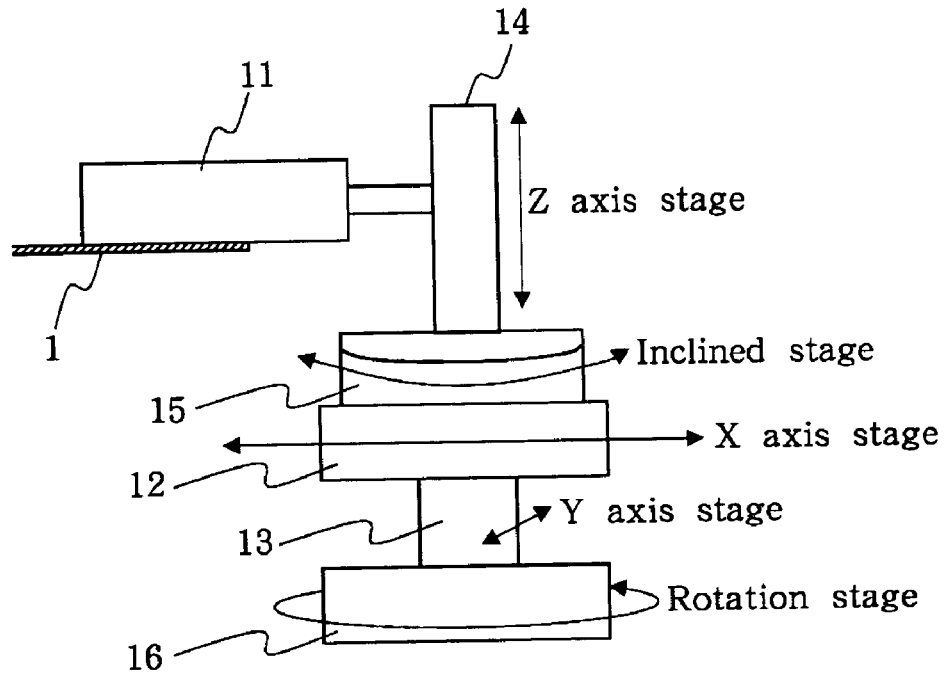
FIG. 5 is a schematic view for illustrating a preferable example of a web-deforming device.

FIG. 5 is a schematic view showing a web-deforming device which is formed of an X axis stage 12, a Y axis stage 13, a Z axis stage 14, an inclined stage 15, and a rotation stage 16, the each stage having a mechanism in which coarse and fine movement can be performed. In the device described above, by operations of the individual stages, since a web-deforming roller 11 can be disposed at an optional position and in an optional direction and can also be rotated, and hence, as the web-deforming device 5 of the present invention, the web-deforming roller 11 may be preferably used. In the case in which this device is used for the present invention, as shown in the figure, when the web-deforming roller 11 is pressed to the web 1, and the web 1 is lifted up or pushed down by the adjustment of the individual stages, the web 1 can be easily deformed.

The web which may be used in the present invention is not specifically limited; however, a plastic film such as a polyolefin film, a polyester film, or a polyamide film may be primarily used, and when a thin film having a thickness of 10 μm or less is used, the effect of the present invention is significant. In addition, before being used in accordance with the present invention, the film may be pretreated by corona discharge or the like, or a web provided with a primer coat layer or a back coated layer may also be used.

A device for removing wrinkles, according to the present invention, is a device in which wrinkles formed on the web 1 are removed while being continuously transported through a plurality of guide members. In addition, the device for removing wrinkles described above comprises a crown roller, used as the guide member 3 described above, and web-deforming device as described above, which are disposed in the transport path of the web 1 and downstream of a zone in which the wrinkles are desirably removed. The conditions for the device are also the same as those described above.

As described above, according to the method and the device for removing wrinkles, of the present invention, even when a thin web is used, wrinkles formed on the web during transport and coating thereof can be preferably removed without any particular backup means, and as a result, because of appropriate removal of wrinkles, a coating method in which a uniform coating thickness is formed by an extrusion coating method can be provided.

EXAMPLES

Hereinafter, the present invention will be described in detail with reference to particular examples. However, the present invention is not limited to the following examples.

First, experiments concerning the relationship between web materials and the conditions of a wrinkle-removing device were carried out.

Comparative Examples 1 to 6 and Examples 1 and 2

Coating Conditions

A nonmagnetic coating liquid, which comprises carbon and iron oxide and which had a viscosity of 0.02 Pa·s (at a shear rate of 3,000/sec), was used as paint, coating was performed on various films shown in Table 1 each having a width of 280 mm by using an extrusion coating device, and the individual films were wound in the form of roll after drying. In coating, as shown in FIGS. 1 and 2, each film was transported along the transport path, and a wrinkle-removing device was operated under the various conditions shown below and in Table 1.

| | |
|---|---|
| Transport Speed of Material (Web) | 100 (m/min) |
| Coating Width | 264 (mm) |
| Coating Length | 3,000 (m) |
| Coating Thickness after Drying | 2 (μm) |
| Tension of Web at Coating Portion | 210 (N/m) |

Layout Conditions of Coating Portion (see FIG. 2)

Wrap Angle at Center Portion of Exit Guide Roller 3: α=45°

Span of Coating Portion: $W_0$=200 (mm)

Coating Position: $W_1$=100 (mm)

Figure 6:
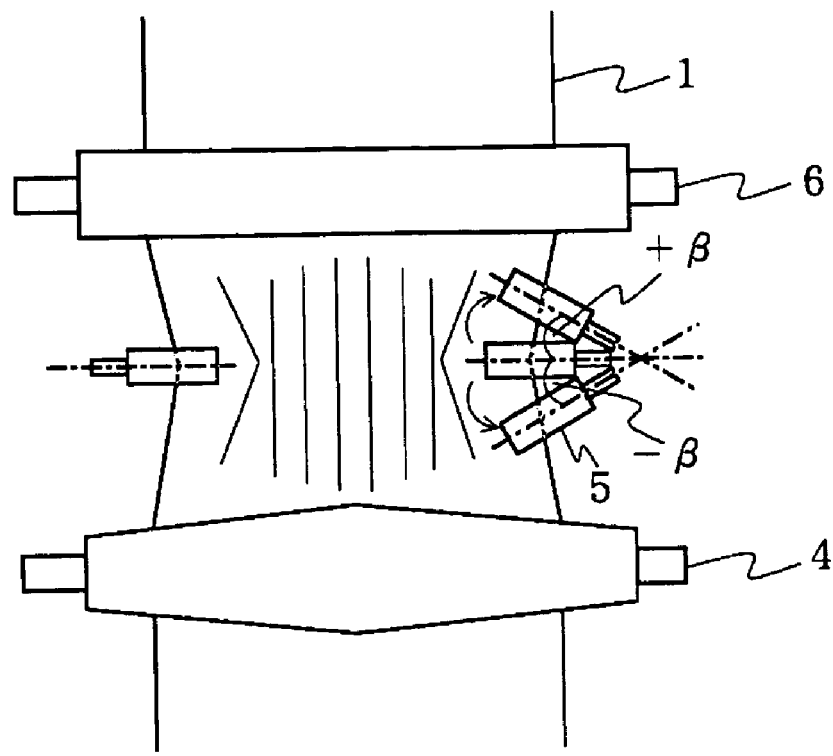
FIG. 6 is a schematic view for illustrating an example of web-deforming device.
Figure 10:
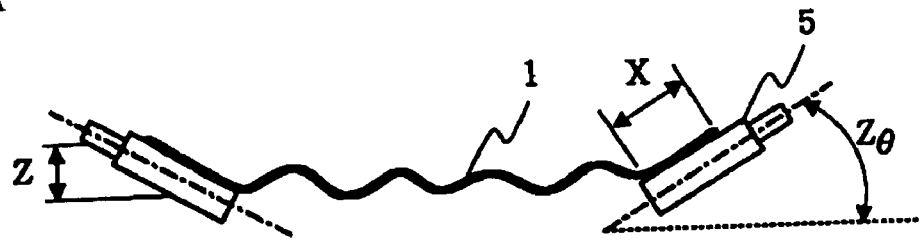
FIG. 10A is a schematic cross-sectional view showing an example of web-deforming device.
FIG. 10B is a schematic cross-sectional view showing an example of web-deforming device.
Figure 10:
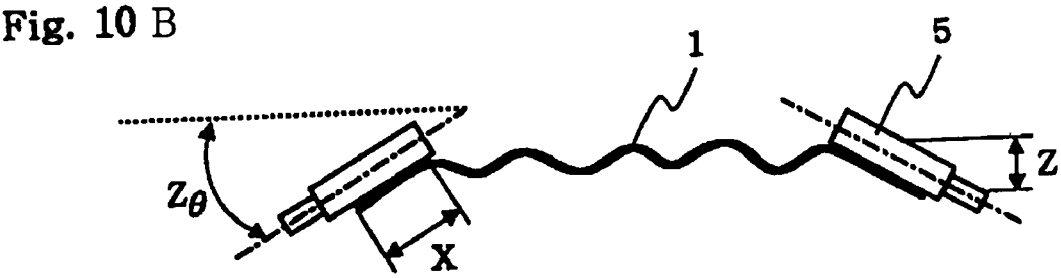

Conditions of Wrinkle-Removing Device (see FIGS. 2, 6, and 10)

(Condition A)

Exit Guide Roller 3: Straight Shape (Crown Amount=0)

Use of Web-Deforming Device 5: No (Condition B)

Exit Guide Roller 3: Straight Shape (Crown Amount=0)

Use of Web-Deforming Device 5: Yes

| | |
|---|---|
| Distance: Y | 50 (mm) |
| Angle: $Z_\theta$ | 8 (deg) |
| Contact Width: X | 75 (mm) |
| Amount: Z | 10 (mm) |
| Swing Angle: β | 0 (deg) |
| (Condition C) | |

Exit Guide Roller 3: Crown Shape (Crown Amount=0.1 mm)

Use of Web-Deforming Mean 5: No (Condition D)

Exit Guide Roller 3: Crown Shape (Crown Amount=0.1 mm)

Use of Web-Deforming Device 5: Yes

| | |
|---|---|
| Distance: Y | 50 (mm) |
| Angle: $Z_\theta$ | 8 (deg) |
| Contact Width: X | 75 (mm) |
| Amount: Z | 10 (mm) |
| Swing Angle: β | 0 (deg) |

TABLE 1

| | COMPARATIVE EXAMPLE 1 | COMPARATIVE EXAMPLE 2 | COMPARATIVE EXAMPLE 3 | EXAMPLE 1 | COMPARATIVE EXAMPLE 4 | COMPARATIVE EXAMPLE 5 | COMPARATIVE EXAMPLE 6 | EXAMPLE 2 |
|---|---|---|---|---|---|---|---|---|
| FILM | PET | PET | PET | PET | PEN | PEN | PEN | PEN |
| THICKNESS (μm) | 5.9 | 5.9 | 5.9 | 5.9 | 5.9 | 5.9 | 5.9 | 5.9 |
| JUDGMENT | X | ▲ | X | o | ▲ | ▲ | X | Δ |
| CONDITION OF WRINKLE-REMOVING DEVICE | A | B | C | D | A | B | C | D |

The judgment standard in Table 1 is as follows.

○: Wrinkles and waves of a web are not observed by visual inspection during transport thereof, coating irregularity is not observed when being held to the light, and variation in coating thickness by X-ray measurement is not more than 0.05

Δ: Wrinkles and waves of a web are observed by visual inspection during transport thereof, coating irregularity at a transmitting surface is an acceptable level, and variation in coating thickness by X-ray measurement is in the range of from more than 0.05 to 0.1 μm.

▲: Wrinkles and waves of a web are observed by visual inspection during transport thereof, apparent coating irregularity is observed at a transmitting surface, and variation in coating thickness by X-ray measurement is in the range of from more than 0.1 to 0.2 μm.

x: Wrinkles and waves of a web are observed by visual inspection during transport thereof, large coating irregularity is observed at a transmitting surface, and variation in coating thickness by X-ray measurement is more than 0.2 μm.

Figure 7:
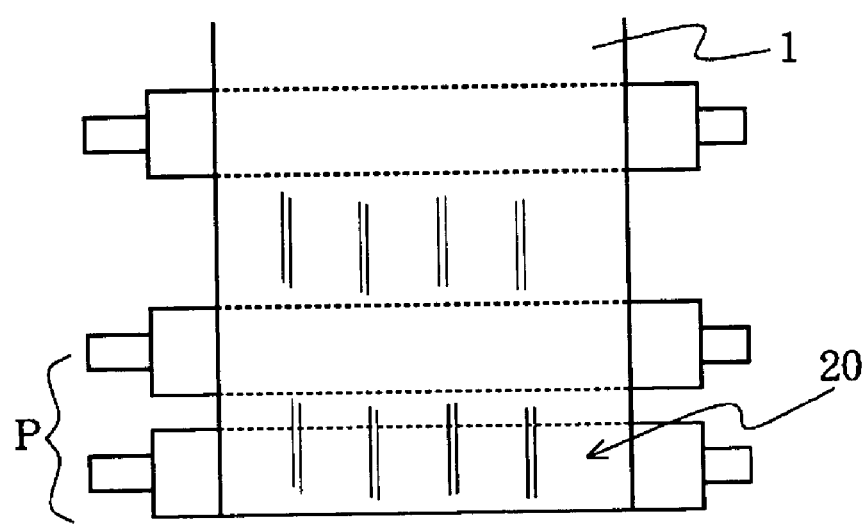

According to the results obtained in comparative examples 1, 2, 4 and 5, in the case in which the exit guide roller 3 had a straight shape, even when the two end portions of the web 1 were pushed down at the downstream side, only a little improving effect was obtained, wrinkles 20 remained in the zone P in which wrinkles were desirably removed, and as a result, satisfactory conditions could not be obtained (see FIG. 7 (a front view of the device for removing wrinkles, when viewed along the direction indicated by the arrow in FIG. 2)). When the two end portions of the web 1 were further pushed down in order to improve the effect, the web 1 was largely deformed and was finally broken, and as a result, the coating quality was very degraded.

Figure 8:
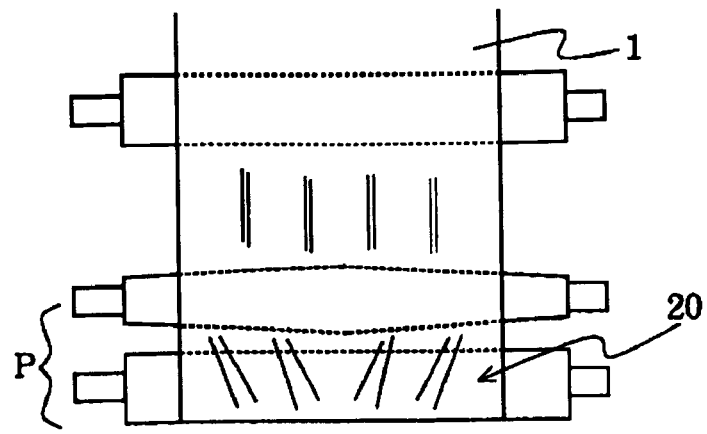

According to the results obtained in comparative examples 3 and 6, the crown roller was only used as the exit guide roller; however, large wrinkles were generated as if flowing from the center to the two end portions, and as a result, large coating irregularity was generated (see FIG. 8 (a front view of the device for removing wrinkles, when viewed along the direction indicated by the arrow in FIG. 2)).

Figure 9:
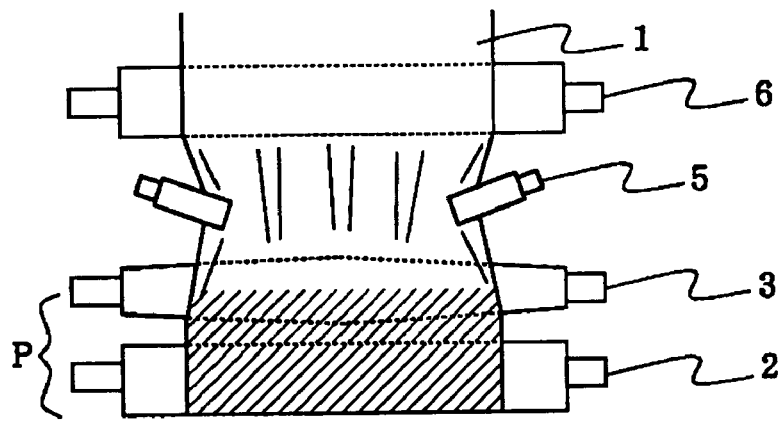

According to the results obtained in examples 1 and 2, when the crown roller was used as the exit guide roller, and the two end portions of the web was pushed down in an appropriate amount at the downstream side, wrinkles were removed in the zone P, and the effect of improving coating irregularity could be obtained (see FIG. 9 (a front view of the device for removing wrinkles, when viewed along the direction indicated by the arrow in FIG. 2)). When poly(ethylene naphthalate) (PEN) was processed under the conditions equivalent to that in example 1 in which the best result was obtained by using poly(ethylene terephthalate), although stripe-shaped coating irregularity slightly remained at the center portion, the final coating irregularity was an acceptable level, and a sufficient effect of removing wrinkles could be obtained for both cases of PET and PEN.

Next, experiments were carried out on the influences of a web tension during coating and conditions of wrinkle-removing device.

Examples 3 and 4

Coating Conditions

A nonmagnetic coating liquid, which was composed of carbon and iron oxide and which had a viscosity of 0.02 Pa·s (at a shear rate of 3,000/sec), was used as paint, coating was performed on poly(ethylene naphthalate) films each having a width of 280 mm and a thickness of 5.9 μm by using an extrusion coating device so as to have different web tensions as shown in Table 2, and the films were wound in the form of roll after drying. In coating, as were the cases of the above comparative examples and examples, each film was transported along the transport path as shown in FIGS. 1 and 2, and the following coating conditions were adopted.

| | |
|---|---|
| Transport Speed of Material | 100 (m/min) |
| Coating Width | 265 (mm) |
| Coating Length | 3,000 (m) |
| Coating Thickness After Drying | 2 (μm) |

Layout Conditions of Coating Portion

The conditions were set equivalent to those of the comparative examples and the examples described above.

Conditions of Wrinkle-Removing Device (Condition E)

Exit Guide Roller 3: Crown Shape (Crown Amount=0.1 mm)

Use of Web-Deforming Device 5: Yes

| | |
|---|---|
| Distance: Y | 50 (mm) |
| Angle: $Z_\theta$ | 8 (deg) |
| Contact Width: X | 75 (mm) |
| Amount: Z | 7 (mm) |
| Swing Angle: β | 0 (deg) |

The results are shown in Table 2. The judgment standard is the same as that described in Table 1.

TABLE 2

| | TENSION (N/m) | JUDGMENT |
|---|---|---|
| EXAMPLE 3 | 210 | Δ~○ |
| EXAMPLE 4 | 228 | ○ |

According to the results obtained in examples 3 and 4, it is confirmed that more superior effects can be obtained by adjusting the web tension at the coating portion. In addition, it is expected that the most preferable condition may be obtained when the thickness of a web material is properly selected.

Next, samples were formed by coating of various paints having various properties, and the same evaluation as described above was performed.

Examples 5 and 6, and Comparative Examples 7 and 8

Coating Conditions

With the use of an extrusion coating device, a magnetic coating liquid containing a magnetic powder and having a viscosity of 0.01 Pa·s (at a shear rate of 3,000/sec) was applied to the nonmagnetic layer, which was formed on the web in example 4, with and without using the wrinkle-removing device, and drying, orientation, and mirror finishing were then performed. Subsequently, a back layer coating liquid containing carbon and having a viscosity of 0.005 Pa·s (at a shear rate of 3,000/sec) was applied by an extrusion coating device to each of the rear surfaces of the webs with and without using the wrinkle-removing device, and after drying and mirror finish treatment were performed, the films were wound in the form of roll. In coating, as were the cases of the above comparative examples and examples, each film was transported along the transport path as shown in FIGS. 1 and 2, and the wrinkle-removing device was operated under the conditions shown below.

| | |
|---|---|
| Transport rate of Material | 200 (m/min) |
| Coating Width | 265 (mm) |
| Coating Length | 3,000 (m) |

Coating Thickness After Drying

| | |
|---|---|
| Magnetic Layer | 0.2 ($\mu$m) |
| Backcoat Layer | 0.5 ($\mu$m) |
| Web Tension | 228 (N/m) |

Layout Conditions of Coating Portion

The conditions were set equivalent to those of the comparative examples and the examples described above.

Conditions of Wrinkle-Removing Device

Condition A was used when the wrinkle-removing device was not used, and condition E was used when the wrinkle-removing device was used.

The results are shown in Table 3.

TABLE 3

| | EXAMPLE 5 | COMPARATIVE EXAMPLE 7 | EXAMPLE 6 | COMPARATIVE EXAMPLE 8 |
|---|---|---|---|---|
| | | TYPE OF COATING LIQUID | | |
| | MAGNETIC COATING LIQUID | | BACK LAYER COATING LIQUID | |
| USE OF WRINKLE-REMOVING DEVICE | YES | NO | YES | NO |
| JUDGMENT | o | X | o | X |

The judgment standard in Table 3 is as follows.

For evaluation of the magnetic layer, light was transmitted therethrough together with the nonmagnetic layer, and for evaluation of the back layer, after the nonmagnetic layer and the magnetic layer were removed by using a solvent, light was transmitted. For both evaluations, visual inspection was performed.

○: Coating irregularity is not substantially observed at a transmitting surface.

x: Large coating irregularity is observed at a transmitting surface.

As described with reference to the examples and comparative examples, it was confirmed that when conditions for removing wrinkles and coating are determined in accordance with conditions of a web which is to be used, wrinkles in the coating portion can be removed and that superior coating can be realized. In addition, by removing wrinkles at the coating portion, even when any type of coating liquid, that is, a liquid for forming a nonmagnetic, a magnetic, or back layer, is used, and in addition, the viscosity thereof is variously changed, superior coating can be realized.

What is claimed is:

1. A method for coating a web which is continuously transported through a plurality of guide members, said plurality of guide member including a crown roller having the diameter which is gradually increased toward the center thereof, the method comprising the steps of:
    placing the crown roller in a transport path of the web and downstream of a first zone in which coating is performed; and
    deforming the web in a second zone located downstream of the crown roller so as to at least decrease the width of the web for removing wrinkles in the first zone, whereby the coating is performed in the first zone in which the wrinkles are removed.

2. A method for coating a web, according to claim 1, wherein the deformation of the web to decrease the width thereof is performed by lifting up or pushing down two side edges of the web.

3. A method for coating a web, according to claim 1, wherein the coating is performed by an extrusion coating device.

4. A method according to claim 1, further comprising:
    adjusting an orientation of an auxiliary roller to deform the web in the second zone.

5. A method according to claim 4, wherein the auxiliary roller is disposed to press on same surface of the web pressed on by the crown roller.

6. A method according to claim 5, wherein a surface of the web opposite to the surface on which the crown and auxiliary rollers press is coated.

7. A device for removing wrinkles formed on a web which is continuously transported through a plurality of guide members, said plurality of guide members comprising:
    a crown roller disposed in a transport path of the web and downstream of a first zone, where coating is performed with a coating device in which wrinkles are desirably removed, the crown roller having the diameter which is gradually increased toward the center thereof; and
    web-deforming device which is disposed in a second zone located downstream of the crown roller so as to at least decrease the width of the web.

8. A device for removing wrinkles, according to claim 7, wherein the web-deforming device is deforming device for lifting up or pushing down two side edges of the web.

9. A device according to claim 7, wherein the web-deforming device comprises an auxiliary roller adjustably oriented to deform the web in the second zone.

10. A device according to claim 9, wherein the auxiliary roller is disposed to press on same surface of the web pressed on by the crown roller.

11. A device according to claim 10, further comprising:
a coating device configured to coat a surface of the web opposite to the surface on which the crown and auxiliary rollers press.

12. A device according to claim 11, wherein the coating device is disposed in the first zone.

* * * * *